United States Patent Office 2,790,826
Patented Apr. 30, 1957

---

2,790,826

METHOD OF PREPARING ALKENYLARYLOXY ALIPHATIC CARBOXYLIC ACIDS

Alfred R. Bader, Milwaukee, Wis., assignor to Pittsburgh Plate Glass Company, Pittsburgh, Pa., a corporation No Drawing. Application May 18, 1953,
Serial No. 355,863

3 Claims. (Cl. 260—521)

This invention relates to a novel class of chemical compounds, the alkenylaryloxy aliphatic carboxylic acids, and the salts, esters and amides thereof, and to a method for the preparation of such compounds, and pertains more particularly to novel butenylphenoxyacetic acids and to the water soluble salts, esters and amides of said acids.

In a copending application, Serial No. 300,359, filed July 22, 1952, it is disclosed that cyclopentadiene will react with phenolic compounds in the presence of a Friedel-Crafts catalyst to give either mono-, di- or tricyclopentenyl phenolic compounds, or mixtures thereof, depending upon the quality of catalyst utilized and the reaction temperature. Also, in a series of copending applications, Serial Nos. 337,226, 337,227; 337,228; and 337,229, all filed February 16, 1953, it is disclosed that acyclic conjugated dienes react with phenolic compounds in the presence of various Friedel-Crafts type compounds to give monoalkenylphenolic compounds or mixtures of mono-, di- and trialkenylphenolic compounds, the nature of the reaction product depending upon the catalyst strength and the reaction temperature. The unsaturated phenolic compounds prepared according to the methods of the copending applications are very useful in the preparation of resins by condensation with aldehydes and are also useful for many other purposes.

It has now been discovered that alkenylphenolic compounds react, in the form of their water-soluble alkali salts, with haloaliphatic carboxylic acids to give a new class of chemical compounds, the alkenylaryloxy aliphatic carboxylic acids and the water-soluble salts, esters and amides thereof. These new compounds, which have not been prepared heretofore, possess the following structure:

$$(R)_n\text{—Ar}(O\text{—}R_1\text{—COOX})_n$$

wherein R is alkenyl, cyclopentenyl, haloalkenyl, halocyclopentenyl, alkoxyalkenyl or alkoxycyclopentenyl, Ar is an aromatic radical, $R_1$ is alkylene or substituted alkylene such as haloalkylene, X is hydrogen, a water-soluble inorganic salt-forming group, an alkyl radical, or —NH$_2$ and each $n$ is a number from 1 to 3 and may be the same or different. The preferred compounds of the above general class are the butenylphenoxyacetic acids and their salts, esters and amides of the structure:

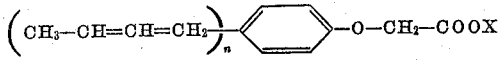

wherein $n$ is a number from 1 to 3 and X has the significance given above. Compounds of this formula, and particularly those in which $n$ is 1 are readily prepared from a haloacetic acid and butenylphenol, which is readily and economically obtained by the reaction of butadiene-1,3 and phenol.

The novel acids and salts of this invention may be prepared by reacting an alkenylphenolic compound in the form of a water-soluble inorganic salt thereof with a haloaliphatic monocarboxylic acid or a salt thereof. This reaction may be depicted structurally as follows, wherein p-2-butenylphenol and chloroacetic acid are utilized for illustrative purposes;

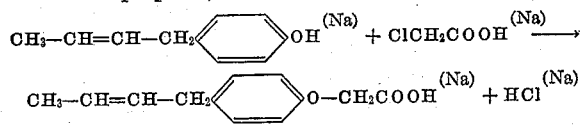

The corresponding novel esters of the alkenylaryloxy aliphatic carboxylic acids are prepared by reacting the acid with an alcohol, preferably in the presence of an esterification catalyst; and the amides by ammonolysis of the esters, acid anhydrides or acid halides.

In preparing the novel compounds of this invention any alkenylphenolic compound may be employed. Such compound may be reacted by the structure

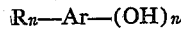

wherein R, Ar and $n$ have the significance set forth above.

The preferred alkenylphenolic compounds of the structure $R_n$—Ar—(OH)$_n$ are those in which R is butenyl and Ar is phenyl, including o- and p-2-butenylphenols, di-2-butenylphenol and tri-2-butenylphenol. However, other alkenylphenolic compounds may also be used, including butenylcresols, butenylcatechols, butenyl-2,5-dichlorophenols, butenyl-2,5-dinitrophenols, butenyl-2,3-dimethoxyphenols, mono-, di- and tributenylresorcinol, mono-, di- and tributenylguaiacol, 2-chlorobutenylcresol, 2-chlorobutenylphenols, 2-iodobutenylphenols, o- and p-cyclopentenylphenols, pentenylphenols, pentenylcresols, pentenylguaiacol, halopentenylphenols, halopentenylguaiacols, hexenylphenols, hexenylcresols, di- and trihexenylcresols, halohexenylphenols, halohexenylchlorophenols, halohexenylcatechols, and the like. All of the above alkenylphenolic compounds, as well as many other compounds possessing the structure $R_n$—Ar—(OH)$_n$, are readily prepared by reacting conjugated dienes with phenolic compounds in the presence of a Friedel-Crafts compound or other of the catalysts disclosed in the copending applications referred to hereinabove. Mixtures of mono-, di- and trialkenylphenolic compounds may be reacted with haloaliphatic monocarboxylic acids to give a corresponding mixture of mono-, di- and trialkenylaryloxy aliphatic carboxylic acids or salts.

Any saturated haloaliphatic monocarboxylic acid, or water-soluble salt thereof may be reacted with alkenylphenolic compounds of the type disclosed in the foregoing paragraph to form novel alkenylaryloxy aliphatic carboxylic acids or salts. Particularly preferred is chloroacetic acid because it is economically obtained in commercial quantities. Others which may be used include alpha-chloropropionic, alphabromopropionic acid, alpha-iodoproprionic acid, beta-chloropropionic acid, beta-bromopropionic acid, alpha-fluoroproprionic acid, alpha-chlorobutyric acid, beta-bromobutyric acid, gammachlorobutyric acid, alpha-chlorovaleric acid, alpha-bromovaleric acid, alpha-chlorostearic acid, and the like.

Hydroxides of the alkali metals, sodium hydroxide, potassium hydroxide and the like are preferred alkaline materials for forming water-soluble salts of the phenolic compound and the haloaliphatic monocarboxylic acid. However, other alkaline materials, for example, calcium hydroxide, barium hydroxide, sodium carbonate, potassium carbonate, ammonia, and the like, may also be employed, particularly if used in combination with an alkali metal hydroxide.

The alkenylphenolic compound and the haloaliphatic monocarboxylic may be brought together in any desired molar proportions. For example, the reactants may be brought together in equimolar quantities or by using an excess of as much as five moles or more of either reactant. Any unreacted material, particularly unreacted phenolic compound, is readily recovered for use in subsequent reactions.

The reaction of the phenolic compound with a haloaliphatic monocarboxylic acid may be carried out by several different procedures. One preferred method consists in first preparing a mixture of the alkenylphenolic compound(s) with an aqueous solution of alkaline material, e. g. sodium hydroxide. To this mixture the haloaliphatic acid is added whereupon an exothermic reaction, often sufficient to bring the water to boiling, takes place. Heating at about 100° C. is continued for approximately an hour at which time the reaction is ordinarily substantially complete.

The alkenylaryloxy aliphatic monocarboxylic acid salt may be recovered from the reaction mixture simply by cooling the mixture to about room temperature, whereupon the salt crystallizes and can be recovered in a very pure form by washing and filtering.

If, however, it is desired to recover the free alkenylaryloxy aliphatic monocarboxylic acid, the reaction mixture is acidified, for example, with a mineral acid such as hydrochloric acid, and the free acid recovered by extraction with a water immiscible solvent such as hexane, heptane or toluene followed by distillation, crystallization, or other purification procedure. The use of an extraction process is especially preferred inasmuch as it permits separation of the o- and p-isomers which are present in the reaction mixture.

Alternatively, the reaction may be carried out by admixing the phenolic compound and the haloaliphatic acid in water and then adding alkali, or by first forming water-soluble alkaline salts of the phenolic compound and the haloaliphatic acid and then dissolving them in water, in which medium the reaction takes place readily.

Esters and amides of the alkenylaryloxy aliphatic monocarboxylic acids thus obtained are prepared by conventional methods of esterification and amidation. For example, the amidation may be carried out by first reacting the acid with oxalyl chloride to form the acid chloride and then reacting the acid chloride with ammonia. Esters are prepared by the reaction of the acid with an alcohol in the presence of an esterification catalyst.

The novel compounds prepared according to the methods set forth above are unconjugated. However, they are readily converted to the conjugated form by isomerization carried out in the presence of alkali.

The following examples illustrate more fully the preparation of novel alkenylaryloxy aliphatic carboxylic acids, salts, esters and amides in accordance with the present invention. The examples are not intended to limit the invention, however, for there are, of course, numerous possible variations and modifications.

*Example I*

To 200 grams of a mixture of butenylphenols (prepared by the reaction of phenol with butadiene-1,3 in the presence of a $H_2SO_4$—$H_3PO_4$ catalyst) and containing predominantly o-2-butenyl-phenol and p-2-butenylphenol, dissolved in a liter of 33 percent aqueous sodium hydroxide, 300 grams of chloroacetic acid were slowly added. After the reaction had subsided, the clear solution was heated on a steam bath for an hour, cooled, and acidified with hydrochloric acid. The waxy product was taken up in hot heptane, and the heptane insoluble o-2-butenylphenoxyacetic acid was filtered off, washed with hot heptane, and dried. A pure product in the form of soft white needles, melting at 137° C. was obtained by crystallization from water.

Evaporation of the heptane filtrate and low temperature crystallization of the waxy product yielded p-2-butenylphenoxyacetic acid melting at 80° C.

The sodium salts of o-2-butenylphenoxyacetic acid and p-2-butenylphenoxyacetic acid can be recovered simply by cooling the reaction mixture to room temperature or lower, or by adding to the reaction mixture a lower alcohol such as methyl or ethyl alcohol in which the salt is insoluble and from which it precipitates.

The o-2-butenylphenoxyacetic acid and the p-2-butenylphenoxyacetic acid, both of which are unconjugated, were each dissolved in concentrated methanolic potassium hydroxide and the methanol removed by distillation until the liquid temperature reached 110° C. The solutions were then refluxed under inert gas for six hours, cooled, acidified, and the crystalline product recrystallized. P-1-butenylphenoxyacetic acid forms shiny white platelets melting at 129°–130° C. O-1-butenylphenoxyacetic acid, crystallized from heptane, forms soft needles melting at 101°–102° C. Ultra-violet spectra show the products to be conjugated.

*Example II*

The unconjugated o-2-butenylphenoxyacetic acid and p-2-butenylphenoxyacetic acid are converted to the ethyl ester by heating them with ethyl alcohol in the presence of a sulfuric acid esterification catalyst. The ester is obtained in good yield.

*Example III*

The amide of o-butenylphenoxyacetic acid is prepared by first reacting the acid with oxalyl chloride to give the acid chloride of o-butenylphenoxyacetic acid. This acid chloride is then converted to the amide by reaction with aqueous ammonia.

Moreover, when the above examples are repeated utilizing other of the butenylphenols or haloaliphatic carboxylic acids disclosed hereinabove, alkenylaryloxy aliphatic carboxylic acids are again obtained in good yields. For example, in this manner o-butenylphenoxypropionic acid and p-butenylphenoxypropionic acid are obtained by the reaction of butenylphenols with chloropropionic acid; dipropenylphenoxybutyric acid is obtained by the reaction of dipropenylphenol and alphachlorobutyric acid; and butenylcresoxyacetic acid is obtained by the reaction of butenylcresol and chloroacetic acid. The salts, esters and amides of these acids and others are obtained in the manner set forth in the specific examples. The novel compounds of this invention can also be prepared by other of the methods disclosed hereinabove.

The novel alkenylaryloxy aliphatic monocarboxylic acids, salts, esters and amides of the present invention are very valuable compounds. For example, they all possess insecticidal and herbicidal properties, even when utilized in low concentrations together with an inert carrier or solvent. Also, the compounds undergo polymerization through the unsaturation in the alkenyl group present in each compound, to form polymers or interpolymers having many useful properties. The alkenylaryloxy aliphatic monocarboxylic acids, salts, esters and amides are also useful as intermediates in the production of other chemical compounds and compositions.

From the foregoing description it will be seen that the alkenylaryloxy aliphatic monocarboxylic acids, salts, esters and amides of the present invention constitute a very valuable class of compounds which has not been prepared heretofore. It is apparent, therefore, that various embodiments of the invention, in addition to those specifically disclosed may be provided without departing from the spirit and scope of the invention as defined in the appended claims.

I claim:

1. A novel compound of a class consisting of p-1-butenylphenoxyacetic acid, o-1-butenylphenoxyacetic acid and sodium salts of said acids.

2. P-1-butenylphenoxyacetic acid.

3. The method of forming 1-butenylphenoxyacetic acid which comprises heating a 2-butenylphenoxyacetic acid in the presence of potassium hydroxide and methanol.

References Cited in the file of this patent

UNITED STATES PATENTS

| | | |
|---|---|---|
| 2,396,513 | Jones | Mar. 12, 1946 |
| 2,563,872 | Rust et al. | Aug. 14, 1951 |